(12) United States Patent
Kim et al.

(10) Patent No.: US 11,108,491 B2
(45) Date of Patent: Aug. 31, 2021

(54) CONCEALED JAMMING ATTACH APPARATUS AND METHOD WHICH USE FALSE ACKNOWLEDGEMENT FRAME

(71) Applicant: AGENCY FOR DEFENSE DEVELOPMENT, Daejeon (KR)

(72) Inventors: Woocheol Kim, Daejeon (KR); Jaehyoung Park, Daejeon (KR)

(73) Assignee: Agency for Defense Development, Daejeon (KR)

( * ) Notice: Subject to any disclaimer, the term of this patent is extended or adjusted under 35 U.S.C. 154(b) by 0 days.

(21) Appl. No.: 16/964,956

(22) PCT Filed: Oct. 12, 2018

(86) PCT No.: PCT/KR2018/012061
§ 371 (c)(1),
(2) Date: Jul. 24, 2020

(87) PCT Pub. No.: WO2019/146877
PCT Pub. Date: Aug. 1, 2019

(65) Prior Publication Data
US 2021/0044378 A1    Feb. 11, 2021

(30) Foreign Application Priority Data

Jan. 26, 2018    (KR) .................. 10-2018-0010211

(51) Int. Cl.
| | | |
|---|---|---|
| *H04K 3/00* | (2006.01) | |
| *H04W 74/08* | (2009.01) | |
| *H04L 5/00* | (2006.01) | |

(52) U.S. Cl.
CPC ............ *H04K 3/40* (2013.01); *H04L 5/0055* (2013.01); *H04W 74/0816* (2013.01)

(58) Field of Classification Search
CPC .... H04W 74/0816; H04K 3/40; H04L 5/0055
See application file for complete search history.

(56) References Cited

U.S. PATENT DOCUMENTS 8,948,683 B2    2/2015    Shany et al.
9,019,928 B2    4/2015    Kim et al.
(Continued)

FOREIGN PATENT DOCUMENTS

CN    102711099 A    10/2012

OTHER PUBLICATIONS

Han et al., "Greedy Receivers in IEEE 802.11 Hotspots", IEEE Transactions on Dependable and Secure Computing, vol. 7, No. 4—11 pages (Jan. 15, 2010).
(Continued)

*Primary Examiner* — Dominic E Rego
(74) *Attorney, Agent, or Firm* — Knobbe Martens Olson & Bear LLP

(57) ABSTRACT

According to one embodiment of the present invention, in a concealed jamming attack using a false acknowledgement frame, a jamming attack is performed at a point in time during which a data frame is transmitted between a transmission node and a reception node and a false acknowledgement frame is transmitted to the data frame transmission node, such that the data frame transmission node cannot detect a data transmission failure in a MAC layer because of the jamming attack, and thus a jamming attack can be concealed.

8 Claims, 5 Drawing Sheets

(56) References Cited

U.S. PATENT DOCUMENTS

| | | | | |
|---|---|---|---|---|
| 9,787,425 | B1* | 10/2017 | Gonzalez | H04K 3/43 |
| 2003/0012176 | A1* | 1/2003 | Kondylis | H04W 28/26 |
| | | | | 370/348 |
| 2004/0156339 | A1* | 8/2004 | Urquhart | H01Q 21/205 |
| | | | | 370/334 |
| 2006/0114826 | A1* | 6/2006 | Brommer | H04W 74/06 |
| | | | | 370/230 |
| 2007/0219717 | A1* | 9/2007 | Chang | G01C 21/3691 |
| | | | | 701/416 |
| 2009/0251354 | A1* | 10/2009 | Zahavi | H04B 7/18504 |
| | | | | 342/20 |
| 2011/0083165 | A1 | 4/2011 | Gopinath et al. | |
| 2011/0317625 | A1* | 12/2011 | Urquhart | H04W 16/10 |
| | | | | 370/328 |
| 2013/0201857 | A1* | 8/2013 | Bhargava | H04K 3/28 |
| | | | | 370/252 |
| 2014/0170963 | A1* | 6/2014 | Delaveau | H04K 3/94 |
| | | | | 455/1 |
| 2015/0016438 | A1* | 1/2015 | Harel | H04W 74/0816 |
| | | | | 370/338 |
| 2015/0188662 | A1* | 7/2015 | Shapira | H04W 12/03 |
| | | | | 455/1 |
| 2015/0189393 | A1* | 7/2015 | Lu | H04N 21/23406 |
| | | | | 725/116 |
| 2015/0237578 | A1* | 8/2015 | Gogate | H04W 52/029 |
| | | | | 370/311 |
| 2015/0382216 | A1* | 12/2015 | Tian | H04B 7/0452 |
| | | | | 370/252 |
| 2016/0100423 | A1* | 4/2016 | Pengoria | H04L 1/1812 |
| | | | | 370/329 |
| 2017/0214486 | A1* | 7/2017 | Choi | H04K 3/65 |

OTHER PUBLICATIONS

Kim et al., "Wireless Jammer using Software-Defined Radios", ACM CoNEXT 2017—23 pages (Dec. 12, 2017).
Office Action of corresponding Korean Patent Application No. 10-2018-0010211—5 pages (dated Apr. 3, 2019).
International Search Report of corresponding PCT Application No. PCT/KR2018/012061—8 pages (dated Jan. 18, 2019).

* cited by examiner

CONCEALED JAMMING ATTACK APPARATUS AND METHOD WHICH USE FALSE ACKNOWLEDGEMENT FRAME

TECHNICAL FIELD

The present invention relates to a jamming attack technique, and more particularly, to a device and method for performing a covert jamming using a fake ACK (acknowledge) frame under an IEEE 802.11 environment.

BACKGROUND OF THE INVENTION

Since a wireless communication provides various conveniences in a way that multiple wireless terminals access a shared medium, its usage has been continuously increased. Among many wireless communication standards, IEEE 802.11 is the most widely used standard because it guarantees high performance and economics. However, the wireless network environment has a vulnerability in that it may be affected by signals from other wireless devices in vicinity due to the open channel characteristics. Accordingly, various studies have been conducted on a jamming attack aimed at the open channel characteristics of a wireless environment in order to interfere with communication of devices and interrupt service thereof under the IEEE 802.11 environment.

Meanwhile, under the IEEE 802.11 environment, in general, the jamming attack continuously generate strong signals to cause signal collisions at a receiving node, but such general jamming attack requires continuous consumption of energy, and thus can be easily detected.

To this end, a research for the jamming attack that is more efficient and difficult to detect has been conducted using the IEEE 802.11 protocol.

For example, in a DCF (distribute coordination function), which is a representative protocol of the IEEE 802.11, a node that wants to transmit a data (DATA) frame transmits a RTS (request-to-send) frame, and transmits the data frame if a CTS (clear-to-send) frame is successfully received from the receiving node within a SIIFS (short inter frame space) time.

Subsequently, if an ACK (acknowledgment) frame is received from the receiving node within the SIFS time after transmission of the data frame is completed, it is determined that the data frame is successfully transmitted. In this case, the jamming attack that uses the IEEE 802.11 protocol as described above interferes with the reception by colliding the RTS/CTS/ACK frames having a shorter length than the data frame as an interfering signal, or predicts a point of time when the data frame after the CTS frame is transmitted and transmits a short interfering signal, thereby enabling the jamming attack that is difficult to detect and more efficient.

However, the above conventional jamming attack that interferes with the transmission and reception of the data frame by using the DCF causes a transmitting node of the data frame to repeat the transmission process, and failure of the repetitive transmission has a problem in that the existence of a jammer can be easily grasped by causing the transmitting node of the data frame to suspect the existence of the jammer.

ADVANCED TECHNICAL LITERATURE

Patent Document

Korean Patent Registration No. 10-1374061 (Registration date: Mar. 7, 2014)

SUMMARY OF THE INVENTION

Therefore, an embodiment of the present invention is to provide a device and method for performing a covert jamming, using a fake ACK (acknowledge) frame that can conceal a jamming attack such that a transmitting node of a data frame cannot identify failure of a data transmission in a MAC layer due to the jamming attack, by performing the jamming attack at a point of time when the data frame is transmitted between the transmitting node and a receiving node and also transmitting the fake ACK frame to the transmitting node of the data frame.

According to one embodiment of the present invention, there is provided a device for performing a covert jamming using a fake ACK (acknowledge) frame, comprising a receiving unit for receiving a signal transmitted and received through a wireless communication network between a transmitting node and a receiving node, a signal analysis unit for analyzing information on the signal received from the receiving unit, a transmitting unit for transmitting a jamming frame to the receiving node through the wireless communication network and transmitting the fake ACK frame to the transmitting node through the wireless communication network, and a jamming control unit for controlling the transmitting unit such that, in case the signal analyzed by the signal analysis unit is a CTS (clear to send) frame, the jamming frame is transmitted to the receiving node at a point of time when the transmitting node transmits a data frame to the receiving node after the CTS frame, and that, in case the transmission of the data frame ends, the fake ACK frame notifying that the data frame has been normally received by the receiving node is transmitted to the transmitting node.

The CTS frame may include information on a data transmission time allocated from start of the data frame to transmission of the reception ACK frame notifying the reception acknowledgment of the data frame, and the jamming control unit may control the transmitting unit to identify a transmission end time of the data frame by subtracting the time allocated to a SIFS (short inter frame space) and the reception ACK frame from the data transmission time, and to transmit the fake ACK frame to the transmitting node after waiting for the time of the SIFS when the transmission end time arrives.

The CTS frame may include information on an address of the receiving node that receives the data frame and an address of the transmitting node, and the jamming control unit may control the transmitting unit to change a source address of the fake ACK frame to the address of the receiving node extracted from the CTS frame and to transmit the fake ACK frame to the transmitting node.

The jamming control unit may control the transmitting unit to transmit the jamming frame at the point of time when the data frame is transmitted, after waiting for the SIFS time when receiving the CTS frame.

According to one embodiment of the present invention, there is provided a method for performing a covert jamming using a fake ACK frame, comprising the steps of:

receiving a signal transmitted and received through a wireless communication network between a transmitting node and a receiving node, analyzing information on the signal received from the receiving unit, in case the received signal is a CTS frame, transmitting a jamming frame to the wireless communication network at a point of time when a data frame is transmitted from the transmitting node to the receiving node after the CTS frame, and in case the transmission of the data frame ends, transmitting the fake ACK frame notifying that the data frame has been normally received by the receiving node to the transmitting node.

The step of transmitting the fake ACK frame may include:

extracting a data transmission time allocated from start of the data frame from the CTS frame to transmission of the reception ACK frame notifying the reception acknowledgment of the data frame, identifying a transmission end time of the data frame by subtracting the time allocated to a SIFS and the reception ACK frame from the data transmission time, and transmitting the fake ACK frame after waiting for the time of the SIFS when the transmission end time arrives.

The CTS frame may include information on an address of the receiving node that receives the data frame and an address of the transmitting node, and a source address of the fake ACK frame may be set to be changed to the address of the receiving node extracted from the CTS frame.

The jamming frame may be transmitted to the wireless communication network at the point of time when the data frame is transmitted, after the SIFS time elapses when receiving the CTS frame.

Effect of the Invention

According to an embodiment of the present invention, a jamming attack can be concealed using a fake ACK frame that causes a transmitting node of a data frame not to identify failure of a data transmission in a MAC layer due to the jamming attack, by performing the jamming attack at a point of time when the data frame is transmitted between the transmitting node and a receiving node and also transmitting the fake ACK frame to the transmitting node of the data frame.

DETAILED DESCRIPTION

Hereinafter, an operation principle of the present invention will be described in detail with reference to the accompanying drawings. In the following description of the present invention, in case it is considered that detailed explanations for known functions or configurations may unnecessarily obscure the subject matters of the present invention, they will be omitted. In addition, the terms to be described later are terminologies defined in consideration of functions in the present invention, which may vary according to a user's or operator's intention or practice. Therefore, the definition will have to be made based on the contents throughout this specification.

Figure 1:
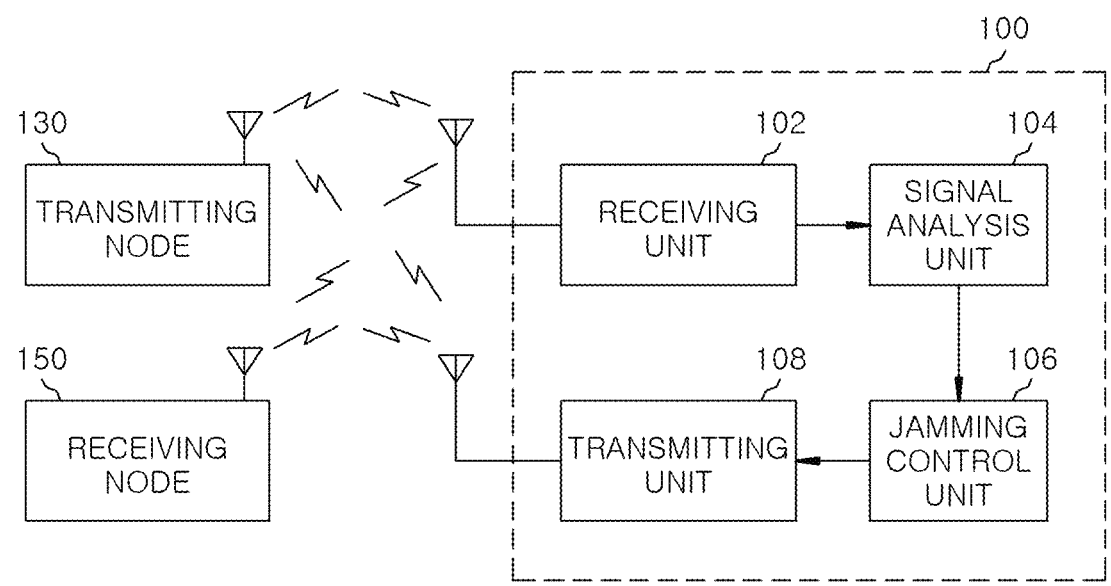
FIG. 1 is a detailed block diagram of a device for performing a covert jamming (also called "a covert jamming attacker") using a fake ACK frame according to an embodiment of the present invention.

FIG. 1 is a detailed block diagram of a device for performing a covert jamming using a fake ACK frame according to an embodiment of the present invention.

Hereinafter, operations for each constitutive element of the device 100 for performing the covert jamming using the fake ACK frame according to an embodiment of the present invention will be described in detail with reference to FIG. 1.

First, a receiving unit 102 receives a signal transmitted and received through a wireless communication network between a transmitting node 130 and a receiving node 150.

In this case, each of the transmitting node 130 and the receiving node 150 is a device capable of transmitting and receiving data using the wireless communication network according to an IEEE 802.11 protocol, and may include, for example, a user terminal, an AP (access point) connected to a base station or the user terminal, and the like, but is not limited thereto.

Further, the signal transmitted and received between the transmitting node 130 and the receiving node 150 according to the IEEE 802.11 protocol may include, for example, a RTS (request to send) frame, a CTS (clear to send) frame, an ACK (acknowledgment) frame, and the like.

The RTS frame is a frame transmitted by the transmitting node 130 to reserve a channel on the wireless communication network in order to transmit data from the transmitting node 130 to the receiving node 150, and may refer to a frame for preventing other nodes in the wireless communication network from transmitting data for a preset time.

The CTS frame is a frame transmitted by the receiving node 150 to reserve a channel (a wireless link) on the wireless communication network, and may mean a frame for preventing other nodes in the wireless communication network from transmitting data for a preset time. Each of the RTS frame and the CTS frame may include information on an address of the receiving node 150 to receive the data frame and an address of the transmitting node 130 to transmit the data frame. In addition, each of the RTS frame and the CTS frame may include information on a data transmission time allocated from a point of time when the data frame is transmitted by the transmitting node 130 until the transmission of the data frame ends and the ACK frame notifying the receiving acknowledgment of the data frame is transmitted by the receiving node 150.

The ACK frame may be a frame transmitted to the transmitting node 130 to notify the normal reception of the data frame when the receiving node 150 normally receives the data frame.

A transmitting unit 108 transmits a jamming frame applied from a jamming control unit 106, to the receiving node 150 through the wireless communication network, and transmits the fake ACK frame to the transmitting node 130 through the wireless communication network.

A signal analysis unit 104 analyzes a signal received from the receiving unit 102. That is, the signal analysis unit 104 analyzes the signal received from the receiving unit 102 to identify whether the corresponding signal is a signal from the RTS frame, the CTS frame, the ACK (acknowledgment) frame, the data frame, or the like.

The jamming control unit 106 controls the transmitting unit 108 when the signal received from the receiving unit 102 is the CTS (clear to send) frame, and transmits the jamming frame for interfering with a normal reception of the data frame from the receiving node 150, to the receiving node 150 through the wireless communication network at the point of time when the data frame is transmitted from the transmitting node 130 to the receiving node 150 after the CTS frame.

Subsequently, the jamming control unit 106 controls the transmitting unit 108 when the transmission of the data frame ends, and transmits the fake ACK frame notifying that the data frame has been normally received by the receiving node 150, to the transmitting node 130. Accordingly, the transmitting node 130 determines that the transmission of the data frame is successful and does not execute a retransmission protocol of the data frame.

Meanwhile, the CTS frame may include information on a data transmission time allocated from start of the data frame to transmission of the ACK (acknowledgment) frame notifying the reception acknowledgment of the data frame.

Therefore, the jamming control unit 106 in the transmission of the fake ACK frame identifies a transmission end time of the data frame by subtracting the time allocated to a SIFS (short inter frame space) and the ACK frame from the data transmission time, and transmits the fake ACK frame to the transmitting node 130 after waiting for the time of the SIFS when the transmission end time arrives.

In addition, the jamming control unit 106 in the transmission of the fake ACK frame may induce such that the transmitting node 130 determines that the fake ACK frame is transmitted from the normal receiving node 150 by changing a source address of the fake ACK frame to an address of the receiving node 150 extracted from the CTS frame and transmitting it to the transmitting node 130.

Figure 2:
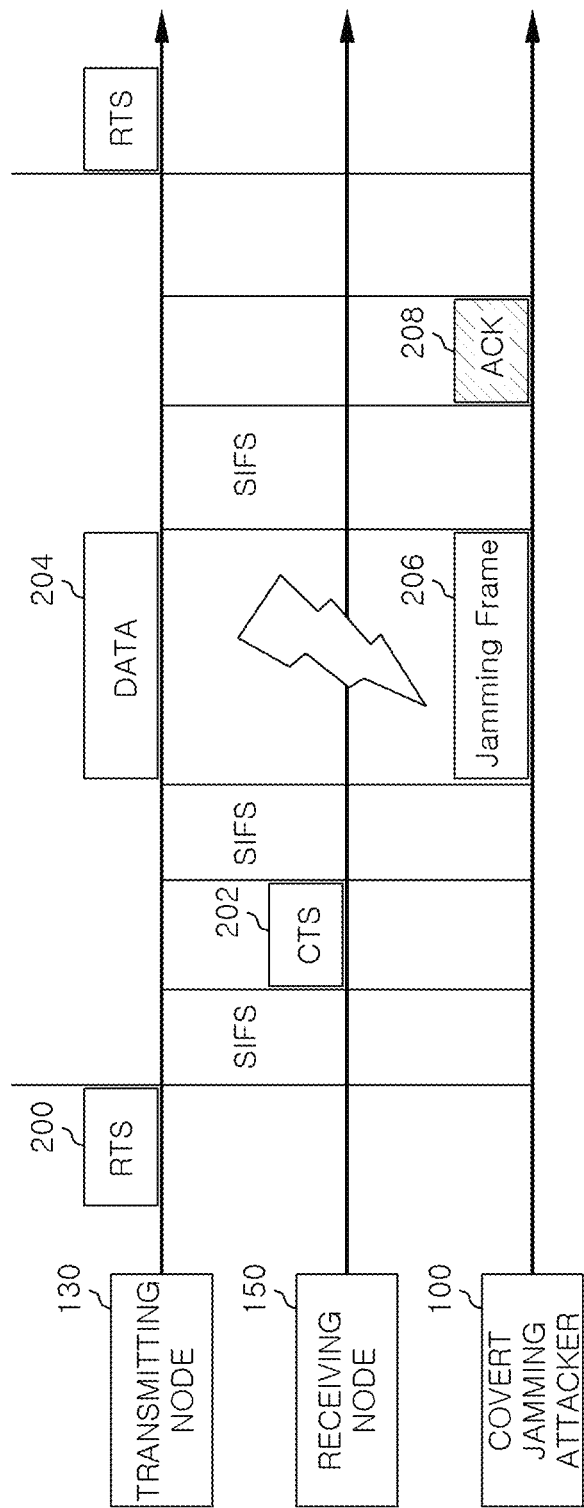
FIG. 2 is a view illustrating a timeline for transmitting a data frame between a transmitting node and a receiving node and a timeline of a covert jamming attacker according to an embodiment of the present invention.

FIG. 2 is a view illustrating a timeline for transmitting a data frame between a transmitting node and a receiving node and a timeline of a device for performing a covert jamming according to an embodiment of the present invention.

First, the transmitting node 130 transmits the RTS frame 200 to a channel on the wireless communication network that transmits the data frame.

Then, the receiving node 150 receives the RTS frame and transmits the CTS frame 202 to the transmitting node 130 after the SIFS.

In this case, when the receiving node 130 transmits the CTS frame 202 to the transmitting node 130 as described above, the device 100 for performing the covert jamming also receives the CTS frame 202, and transmits the jamming frame 206 for interfering with the reception of the data frame 204 to the wireless communication network after the SIFS.

Accordingly, the jamming frame 206 and the data frame 204 collide with each other, so that the receiving node 150 receives a damaged data frame 204 and does not normally receive the data frame 204 successfully, thereby failing to transmit the ACK frame.

In this case, if the transmitting node 130 transmits the data frame 204 and fails to receive the ACK frame from the receiving node 150 before timeout, the transmitting node 130 determines that there has been a failure of the transmission of the data frame 204, and thus repeats the previous retransmission protocol of the data frame such that the existence of the device 100 for performing the covert jamming can be grasped.

Therefore, the device 100 for performing the covert jamming transmits the jamming frame 206 as described above such that the transmitting node 130 does not recognize the transmission failure of the data frame 204, and generates the fake ACK frame 208 after the SIFS to transmit it to the transmitting node 130.

As such, when the device 100 for performing the covert jamming transmits the fake ACK frame 208 to the transmitting node 130 at the point of time when the receiving node 150 transmits the ACK frame as described above, the transmitting node 130 determines that the data frame 204 has been successfully transmitted to the receiving node 150.

Accordingly, the transmitting node 130 does not identify that the data frame 204 has failed to be transmitted in a MAC layer due to the jamming attack, and does not execute the retransmission protocol of the data frame 204, thereby concealing the jamming attack while interfering with the reception of the data frame 204.

Figure 3:
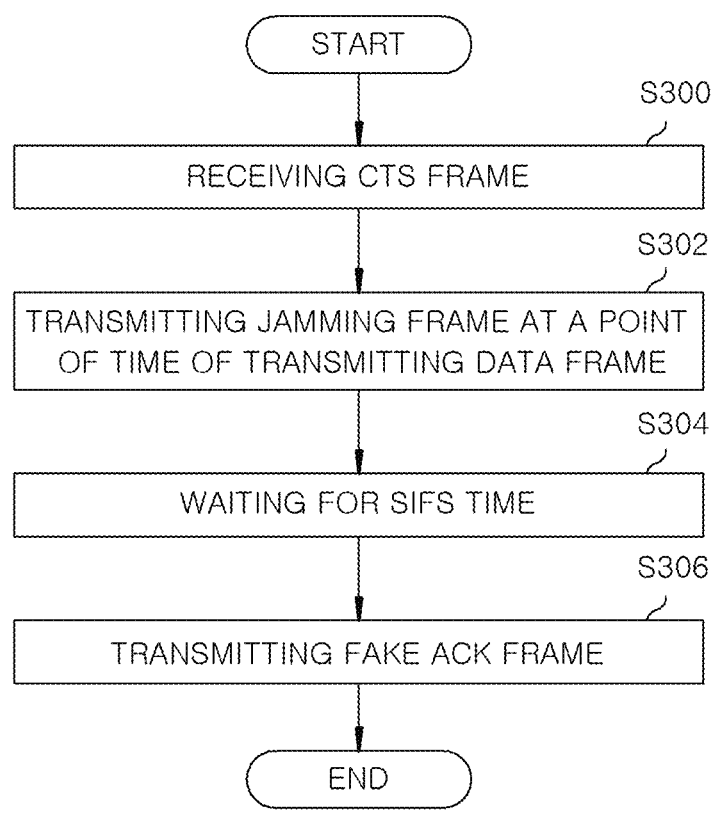
FIG. 3 is a flowchart showing an operation control in a covert jamming attacker using a fake ACK frame according to an embodiment of the present invention.

FIG. 3 is a flowchart showing an operation control flow in a device for performing a covert jamming using a fake ACK frame according to an embodiment of the present invention. Hereinafter, an embodiment of the present invention will be described in detail with reference to FIGS. 1 to 3.

First, the transmitting node 130 transmits the RTS frame to a channel on the wireless communication network that transmits the data frame, and the receiving node 150 receiving the RTS frame transmits the CTS frame after the SIFS.

Then, the device 100 for performing the covert jamming analyzes a signal transmitted and received between the transmitting node 130 and the receiving node 150 to receive the CTS frame transmitted from the receiving node 150 to the transmitting node 130 (S300).

Subsequently, when the CTS frame is received, the device 100 for performing the covert jamming transmits the jamming frame for interfering with the normal reception of the data frame from the receiving node 150 at the point of time when the data frame is transmitted from the transmitting node 130 to the receiving node 150 after the CTS frame (S302).

Then, when the transmission of the data frame is terminated, the device 100 for performing the covert jamming waits for the SIFS time (S304), and then transmits the fake ACK frame notifying that the data frame has been normally received by the receiving node 150, to the transmitting node 130 (S306).

Accordingly, the transmitting node 130 determines that the transmission of the data frame is successful and does not execute the retransmission protocol of the data frame, thereby concealing the jamming attack while interfering with the reception of the data frame from the receiving node 150.

Figure 4:
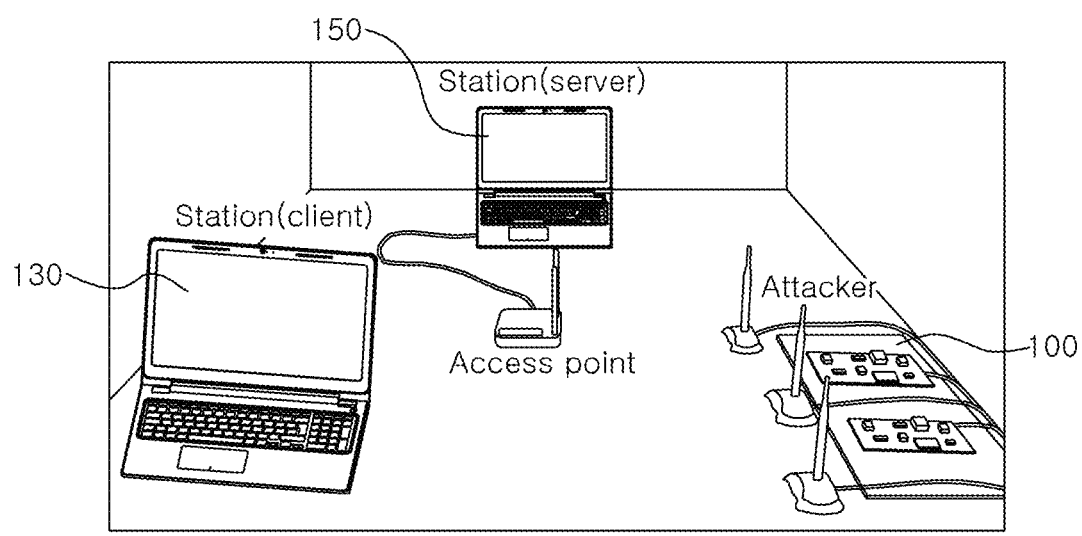
FIG. 4 is a view illustrating an experimental environment that attacks a covert jamming using a fake ACK frame according to an embodiment of the present invention.
Figure 5:
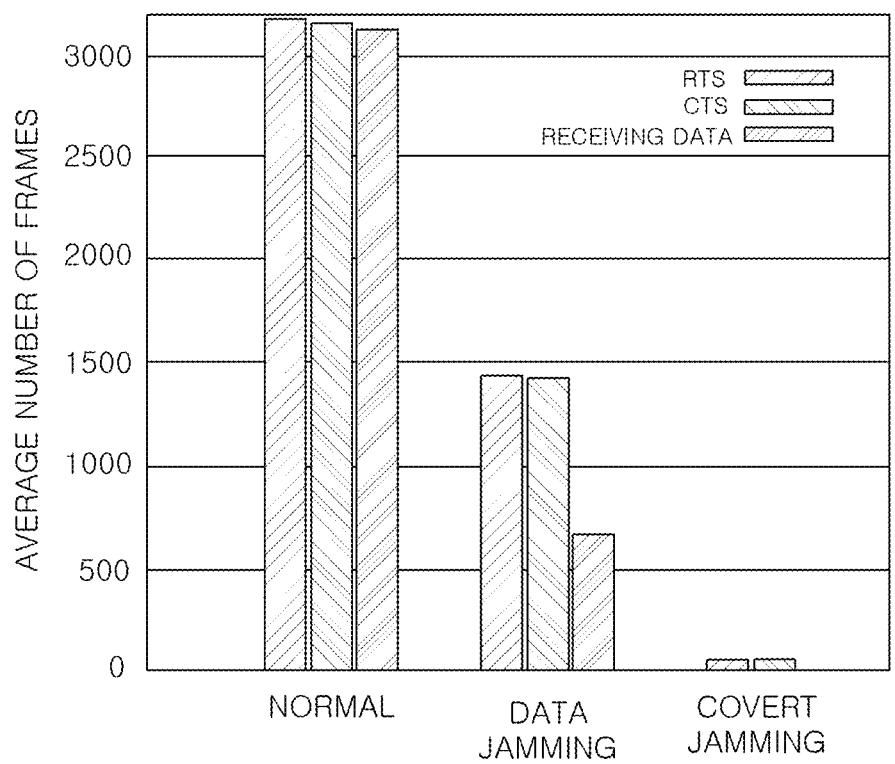
FIG. 5 is a view graphically illustrating experimental results of a covert jamming attack according to an embodiment of the present invention.

FIG. 4 is a view illustrating an experimental environment that attacks a covert jamming using a fake ACK frame according to an embodiment of the present invention, and FIG. 5 is a view graphically illustrating experimental results of a covert jamming attack according to an embodiment of the present invention.

FIG. 4 was configured to illustrate a transmitting node (station: client) 130, an AP (access point), a receiving node (station: server) 150, and a device 100 for performing a covert jamming under the experimental environment that attacks the covert jamming according to an embodiment of the present invention.

In this case, the transmitting node 130 and the receiving node 150 used a laptop equipped with an Intel PRO/Wireless 3945ABG wireless LAN card, and the AP created the experimental environment using an ipTIME A1004 router.

The device 100 for performing the covert jamming was implemented using a software-defined radio (SDR) Wireless Open Access Research Platform (WARP) v3 board and a WARPNet framework.

In order to verify an effectiveness of the covert jamming attack, a TCP flow was generated 10 times for 2 seconds from the transmitting node 130 connected to the AP by a wireless LAN to the receiving node 150 connected to the AP by a wire, using Iperf. Thereafter, the average number of RTS frames transmitted from the transmitting node 130, the average number of CTS frames transmitted from the AP, and the number of data packets successfully received to the receiving node 150 were investigated according to a normal situation without the jamming attacker, a data jamming situation in which the jamming attacker of an existing data frame is operated without the covert technique, and a covert jamming situation in which the covert jamming attacker 100 according to an embodiment of the present invention is operated.

Referring to FIG. 5, first, the number of RTS/CTS frames and the number of data packets successfully received to the receiving node 150 are confirmed to be about 3170 in the normal situation without the jamming attacker. It can be confirmed that the number of RTS/CTS frames is 1431 in the data jamming situation in which the jamming attacker of the existing data frame is operated. In this case, if the jamming attack of the data frame is successful, the transmitting node 130 fails to transmit the data frame, and transmits the RTS/CTS frames that are about half less than the situation without the jamming attacker because a contention window size of the transmitting node 130 increases due to a binary exponential backoff of the DCF. In addition, it can be seen that the number of data packets successfully received to the receiving node 150 is 661. That is, a success rate of the jamming of the data frame is 53.8%.

Herein, since the covert jamming attacker 100 supports only IEEE 802.11g, it can be confirmed that 770 data packets are successfully jammed. That is, the transmitting node 130 transmits the data frame at a rate of 2 MB/s using IEEE 802.11b, if the transmission of the data frame fails repeatedly.

About 53 RTS/CTS frames are transmitted under the covert jamming situation. Further, the number of TCP data packets successfully received by the receiving node 150 is about one. According to the measured result, it can be confirmed that the receiving node 150 has successfully received much fewer packets than when compared to the jamming of the existing data frame. This is because, due to the data jamming, even if the receiving node 150 has failed to successfully receive the packets, the transmitting node 130 waits for the reception of an acknowledgment packet corresponding to the data packet transmitted from the receiving node 150 until timeout of the TCP retransmission expires. That is, it can be seen that the transmitting node 130 does not identify the transmission failure in the MAC layer and attempts very little retransmission compared to the same time. It was shown from the above results of FIG. 5 that the jamming of the data frame was successfully concealed through the insertion attack of the fake ACK frame.

In other words, it can be seen that the covert jamming attack conceals a presence of the jamming in the IEEE 802.11 MAC layer and can perform a more effective attack, unlike the conventional jamming whose main aim is to interfere with the transmission or the reception of the frame through a strong interfering signal.

As described above, the covert jamming attack using the fake ACK frame according to an embodiment of the present invention can conceal the jamming attack such that the transmitting node of the data frame cannot identify failure of a data transmission in the MAC layer due to the jamming attack, by performing the jamming attack at the point of time when the data frame is transmitted between the transmitting node and the receiving node and also transmitting the fake ACK frame to the transmitting node of the data frame transmitting node.

Combinations of steps in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the steps of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the steps of the flowcharts.

Each step in the flowchart may represent a module, segment, or portion of code, which comprises one or more executable instructions for implementing the specified logical function(s). It should also be noted that, in some alternative implementations, the functions noted in the block may occur out of the order noted in the figures. For example, two steps shown in succession may, in fact, be executed substantially concurrently, or the steps may sometimes be executed in the reverse order, depending upon the functionality involved.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What are claimed are:

1. A device for performing a covert jamming using a fake ACK (acknowledge) frame, comprising:
a receiving unit configured to obtain a signal transmitted and received through a wireless communication network between a transmitting node and a receiving node,
a signal analysis unit configured to analyze information on the signal obtained by the receiving unit,
a transmitting unit configured to transmit a jamming frame to the receiving node through the wireless communication network and configured to transmit the fake ACK frame to the transmitting node through the wireless communication network, and
a jamming control unit configured to control the transmitting unit such that, in case the signal analyzed by the signal analysis unit includes a CTS (clear to send) frame, the jamming frame is transmitted to the receiving node at a point of time when the transmitting node transmits a data frame to the receiving node after the CTS frame, and that, in case the transmission of the data frame ends, the fake ACK frame notifying that the data frame has been normally received by the receiving node is transmitted to the transmitting node.

2. The device for performing the covert jamming using the fake ACK frame, according to claim 1,
wherein the CTS frame includes information on a data transmission time allocated from start of the data frame to transmission of the reception ACK frame notifying the reception acknowledgment of the data frame, and
wherein the jamming control unit controls the transmitting unit to identify a transmission end time of the data frame by subtracting the time allocated to a SIFS (short inter frame space) and the reception ACK frame from the data transmission time, and to transmit the fake ACK frame to the transmitting node after waiting for the time of the SIFS when the transmission end time arrives.

3. The device for performing the covert jamming using the fake ACK frame, according to claim 1,
wherein the CTS frame includes information on an address of the receiving node that receives the data frame and an address of the transmitting node, and
wherein the jamming control unit controls the transmitting unit to change a source address of the fake ACK frame to the address of the receiving node extracted from the CTS frame and to transmit the fake ACK frame to the transmitting node.

4. The device for performing the covert jamming using the fake ACK frame, according to claim 1,
wherein the jamming control unit controls the transmitting unit to transmit the jamming frame at the point of time when the data frame is transmitted, after waiting for the SIFS time when receiving the CTS frame.

5. A method for performing a covert jamming using a fake ACK frame, comprising the steps of:
receiving a signal transmitted and received through a wireless communication network between a transmitting node and a receiving node,
analyzing information on the signal received from the receiving unit,
in case the received signal is a CTS frame, transmitting a jamming frame to the wireless communication network at a point of time when a data frame is transmitted from the transmitting node to the receiving node after the CTS frame, and
in case the transmission of the data frame ends, transmitting the fake ACK frame notifying that the data frame has been normally received by the receiving node to the transmitting node.

6. The method for performing the covert jamming using the fake ACK frame, according to claim 5,
wherein the step of transmitting the fake ACK frame includes:
extracting a data transmission time allocated from start of the data frame from the CTS frame to transmission of the reception ACK frame notifying the reception acknowledgment of the data frame,
identifying a transmission end time of the data frame by subtracting the time allocated to a SIFS and the reception ACK frame from the data transmission time, and
transmitting the fake ACK frame after waiting for the time of the SIFS when the transmission end time arrives.

7. The method for performing the covert jamming using the fake ACK frame, according to claim 5,
wherein the CTS frame includes information on an address of the receiving node that receives the data frame and an address of the transmitting node, and
wherein a source address of the fake ACK frame is set to be changed to the address of the receiving node extracted from the CTS frame.

8. The method for performing the covert jamming using the fake ACK frame, according to claim 5,
wherein the jamming frame is transmitted to the wireless communication network at the point of time when the data frame is transmitted, after the SIFS time elapses when receiving the CTS frame.

* * * * *